(12) United States Patent
Lee et al.

(10) Patent No.: US 10,775,539 B2
(45) Date of Patent: Sep. 15, 2020

(54) POLARIZING PLATE AND LIQUID CRYSTAL DISPLAY COMPRISING THE SAME

(71) Applicant: SAMSUNG SDI CO., LTD., Yongin-si, Gyeonggi-do (KR)

(72) Inventors: Seong Hoon Lee, Suwon-si (KR); Young Oh, Suwon-si (KR); Jeong Ho Lee, Suwon-si (KR); Young Hyun Ju, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 78 days.

(21) Appl. No.: 15/052,752

(22) Filed: Feb. 24, 2016

(65) Prior Publication Data
US 2016/0252665 A1 Sep. 1, 2016

(30) Foreign Application Priority Data

Feb. 27, 2015 (KR) .................. 10-2015-0028637
Nov. 6, 2015 (KR) .................. 10-2015-0156117

(51) Int. Cl.
*G02B 5/30* (2006.01)
*G02F 1/1335* (2006.01)
*G02B 1/14* (2015.01)

(52) U.S. Cl.
CPC .............. *G02B 5/305* (2013.01); *G02B 1/14* (2015.01); *G02B 5/3083* (2013.01); *G02F 1/133528* (2013.01); *G02F 2001/133507* (2013.01)

(58) Field of Classification Search
CPC ...... G02B 5/30; G02B 5/3025; G02B 5/3033; G02B 5/3041; G02B 5/305; G02B 5/3083;

(Continued)

(56) References Cited

U.S. PATENT DOCUMENTS 5,745,199 A * 4/1998 Suzuki .............. G02F 1/133526
349/57
6,483,562 B1 * 11/2002 Fukuyoshi ........ G02F 1/133504
349/113

(Continued)

FOREIGN PATENT DOCUMENTS

CN      201314990 Y      9/2009
CN      104252016 A      12/2014

(Continued)

OTHER PUBLICATIONS

CN201314990 English Language Machine Translation, generated via Espacenet on Nov. 9, 2017.*

(Continued)

*Primary Examiner* — Stephone B Allen
*Assistant Examiner* — Adam W Booher
(74) *Attorney, Agent, or Firm* — Lewis Roca Rothgerber Christie LLP

(57) ABSTRACT

A polarizing plate includes: a polarizer; a pattern layer on one surface of the polarizer, the pattern layer including a first refractive index layer having at least one engraved pattern and a second refractive index layer having a filling pattern filling at least a portion of the engraved pattern, the first refractive index layer having a higher refractive index than the second refractive index layer; and a first protective layer. The polarizing plate has a structure in which the polarizer, the second refractive index layer, the first refractive index layer and the first protective layer are sequentially stacked in that order, or in which the polarizer, the first protective layer, the second refractive index layer and the first refractive index layer are sequentially stacked in that order. The first protective layer includes a base film including at least one resin of triacetylcellulose, polyethylene terephthalate, cyclic olefin polymer, and acrylic resins.

15 Claims, 6 Drawing Sheets

(58) Field of Classification Search
CPC ... G02B 1/14; G02F 1/1335; G02F 1/133524; G02F 1/133526; G02F 1/133528; G02F 1/133504; G02F 1/133611; G02F 2001/133507; G02F 2001/133562
See application file for complete search history.

(56) References Cited

U.S. PATENT DOCUMENTS

| | | | |
|---|---|---|---|
| 2009/0284683 A1* | 11/2009 | Usukura | G02F 1/133526 349/62 |
| 2012/0307191 A1 | 12/2012 | Park et al. | |
| 2014/0293197 A1* | 10/2014 | Shin | G02B 5/3083 349/96 |
| 2015/0293392 A1* | 10/2015 | Yanai | G02F 1/13363 349/96 |

FOREIGN PATENT DOCUMENTS

| | | |
|---|---|---|
| EP | 0 640 850 A2 * | 3/1995 ............... G02B 3/00 |
| EP | 2 474 844 A1 | 7/2012 |
| EP | 2 747 166 A2 | 6/2014 |
| JP | 07-043703 | 2/1995 |
| JP | 2001194517 A | 7/2001 |
| JP | 2006-251659 A | 9/2006 |
| JP | 2009-265616 A | 11/2009 |
| JP | 2012-208376 | 10/2012 |
| JP | 2014-123568 A | 7/2014 |
| JP | 2015-028578 | 2/2015 |
| KR | 10-2009-0053278 | 5/2009 |
| KR | 10-2012-0101401 | 9/2012 |
| KR | 10-2009-0041884 | 8/2013 |
| KR | 10-2014-0080421 | 6/2014 |
| KR | 10-1421025 | 7/2014 |
| KR | 10-2014-0115882 | 10/2014 |
| KR | 10-2014-0142115 | 12/2014 |
| TW | 200725081 | 7/2007 |
| TW | 201447351 A | 12/2014 |
| WO | WO 2008/032490 A1 | 3/2008 |

OTHER PUBLICATIONS

Su et al., "Thermal properties of high refractive index epoxy resin system", Thermochimica Acta, 392-393, 2002, pp. 385-389 (Year: 2002).*

TIPO Office Action dated Sep. 26, 2016, for corresponding Taiwanese Patent Application No. 105105756 (6 pages).

Korean Office Action dated Apr. 29, 2016 of the corresponding Korean Patent Application No. 10-2015-0028637 (7 pages).

Office action in corresponding Chinese Patent Application No. 201610108075.0, Office action dated Jan. 2, 2018 (7 pgs.).

Japan Office Action dated Dec. 3, 2019 from corresponding Japan Application No. 2016-033198 (5 pgs.).

* cited by examiner

POLARIZING PLATE AND LIQUID CRYSTAL DISPLAY COMPRISING THE SAME

CROSS-REFERENCE TO RELATED APPLICATIONS

This application claims priority to and the benefit of Korean Patent Application No. 10-2015-0028637, filed on Feb. 27, 2015 and Korean Patent Application No. 10-2015-0156117, filed on Nov. 6, 2015 in the Korean Intellectual Property Office, the entire disclosures of both of which are incorporated herein by reference.

FIELD

Embodiments of the present invention relate to a polarizing plate and a liquid crystal display including the same.

DESCRIPTION OF THE RELATED ART

A liquid crystal display includes a liquid crystal panel that receives light from a backlight unit, and selectively transmits the light during operation. This way, the liquid crystal display typically provides good color quality at a front side thereof. However, the liquid crystal display generally exhibits lower qualities at lateral sides thereof in terms of color quality, contrast ratio and/or viewing angle in comparison to the front side thereof.

The liquid crystal display includes a polarizing plate, a liquid crystal panel, and a backlight unit. In order to improve color quality and contrast ratio at lateral sides of the liquid crystal display, various attempts have been made to develop an improved liquid crystal panel or a liquid crystal structure. However, modification of the liquid crystal panel has limitations in improvement of color quality and contrast ratio at the lateral sides of the liquid crystal display and generally requires a complicated process. Moreover, the liquid crystal display undergoes increasing deterioration in brightness uniformity with increasing screen size of the liquid crystal display. Accordingly, a separate liquid crystal display module is generally provided depending upon screen size, thereby deteriorating processability and economic feasibility One example of the background technique is disclosed in Japanese Patent Laid-open Publication No. 2006-251659.

SUMMARY

According to an example embodiment of the present invention, a polarizing plate includes: a polarizer; a pattern layer on one surface of the polarizer, the pattern layer including a first refractive index layer having at least one engraved pattern and a second refractive index layer having a filling pattern filling at least a portion of the engraved pattern, the first refractive index layer having a higher refractive index than the second refractive index layer; and a first protective layer. The polarizing plate has a stack structure in which the polarizer, the second refractive index layer, the first refractive index layer and the first protective layer are sequentially stacked in that order, or a stack structure in which the polarizer, the first protective layer, the second refractive index layer and the first refractive index layer are sequentially stacked in that order. The first protective layer includes a base film including at least one resin of triacetylcellulose, polyethylene terephthalate, cyclic olefin polymer, and acrylic resins.

The engraved pattern may include an optical pattern having a curved surface, or a prism pattern having a triangular to decagonal cross-section.

The engraved pattern may include an optical pattern having a truncated triangular cross-sectional prism shape, a truncated lenticular lens shape, or a shape having one or more flat surfaces at an uppermost surface thereof and having an n-gonal cross-section (n being an integer greater than or equal to 5).

The first refractive index layer may further include a flat portion between adjacent engraved patterns.

A ratio of a maximum pitch of the engraved pattern to a pitch of the flat portion may be about 1 or less.

A difference in refractive index between the first refractive index layer and the second refractive index layer may be about 0.30 or less.

The first protective layer may have an in-plane retardation (Re) of about 8,000 nm or more at a wavelength of 550 nm and may include a polyethylene terephthalate resin.

The first protective layer may include the base film and a primer layer on at least one surface of the base film, and a ratio of a refractive index of the primer layer to a refractive index of the base film may be about 1.0 or less.

The first protective layer may have a light transmittance of about 90% or more at a wavelength of 550 nm.

The first protective layer may be formed by uniaxially stretching a base film including the polyethylene terephthalate resin.

The second refractive index layer, the first refractive index layer, and the first protective layer may be sequentially stacked on the polarizer.

The first refractive index layer may be directly on the first protective layer.

The polarizing plate may further include a bonding layer between the polarizer and the second refractive index layer.

The polarizing plate may further include a second protective layer on another surface of the polarizer that is opposite the one surface.

The second protective layer may include a film including at least one of triacetylcellulose, polyethylene terephthalate, cyclic olefin polymer, and acrylic resins.

In accordance with some example embodiments of the present invention, a liquid crystal display may include at least one of the polarizing plates as set forth above.

DETAILED DESCRIPTION

Figure 1:
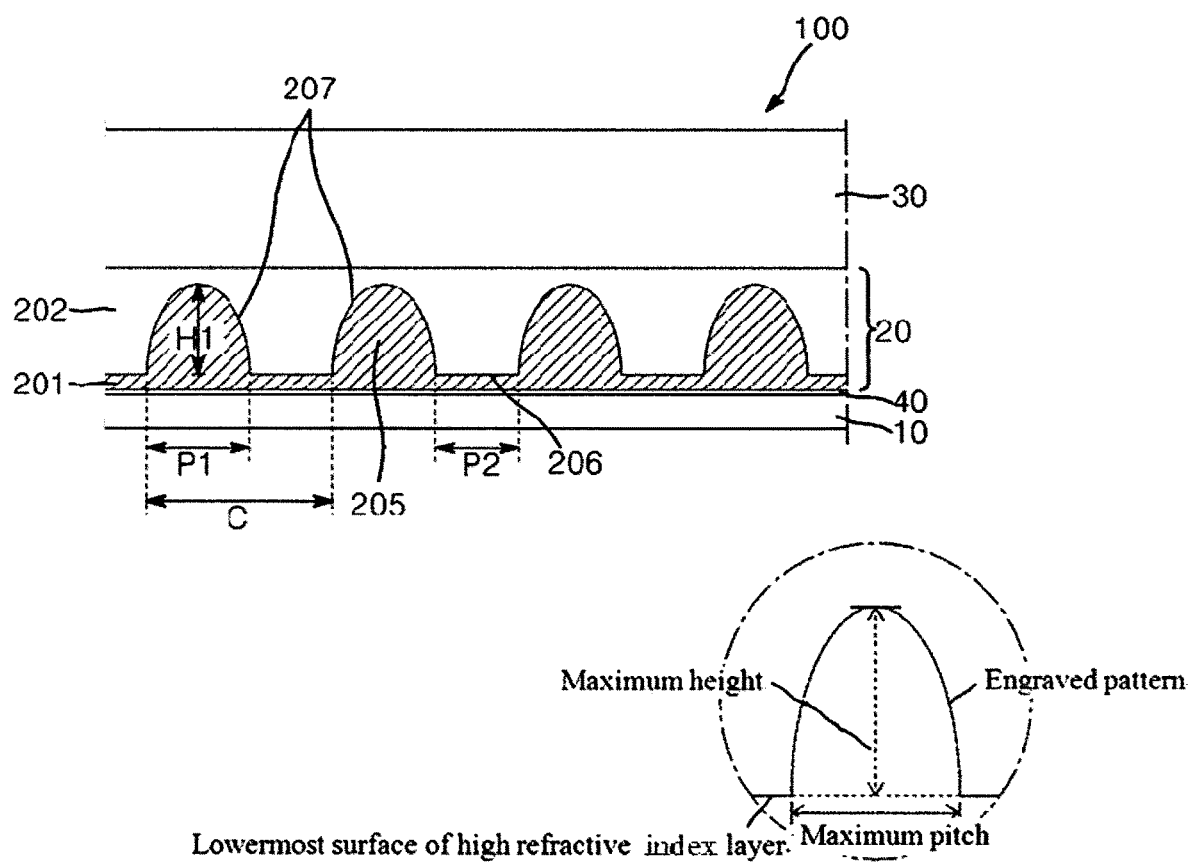
FIG. 1 is a cross-sectional view of a polarizing plate according to one example embodiment of the present invention.

Example embodiments of the present invention will be described in detail with reference to the accompanying drawings to enable those skilled in the art to practice embodiments of the present invention. It should be understood that the present invention may be embodied in different ways and is not limited to the following example embodiments. In the drawings, portions irrelevant to the description will be omitted for clarity. Like components will be denoted by like reference numerals throughout the specification.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present invention. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include ail higher numerical limitations subsumed therein.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

As used herein, the terms "horizontal direction" and "vertical direction" refer to a longitudinal direction and a transverse direction of a rectangular screen of a liquid crystal display, respectively.

As used herein, the term "side surface" refers to a region in which $\theta$ ranges from 60° to 90° in a spherical coordinate system ($\phi$, $\theta$) in which a front side is indicated by (0°,0°), a left end point is indicated by (180°,90°), and a right end point is indicated by (0°, 90°) with reference to the horizontal direction.

As used herein, the term "aspect ratio" refers to a ratio of maximum height of an optical structure to maximum width of the optical structure (maximum height/maximum width). As used herein, the term "cycle" refers to a distance between adjacent engraved pattern, such as the sum of a pitch of one engraved pattern and a pitch of one flat portion in a high refractive index layer of a pattern layer. As used herein, the term "in-plane retardation (Re)" is represented by Equation A, the term "out-of-plane retardation (Rth)" is represented by Equation B, and the term "degree of biaxiality (NZ)" is represented by Equation C:

$$Re = (nx - ny) \times d \qquad \text{Equation A}$$

$$Rth = ((nx + ny)/2 - nz) \times d \qquad \text{Equation B}$$

$$NZ = (nx - nz)/(nx - ny) \qquad \text{Equation C}$$

(wherein, nx, ny, and nz are refractive indices at a wavelength of 550 nm in the slow axis direction, the fast axis direction and the thickness direction of a corresponding optical device, respectively, and d is the thickness of the corresponding optical device (unit: nm)).

Figure 9:
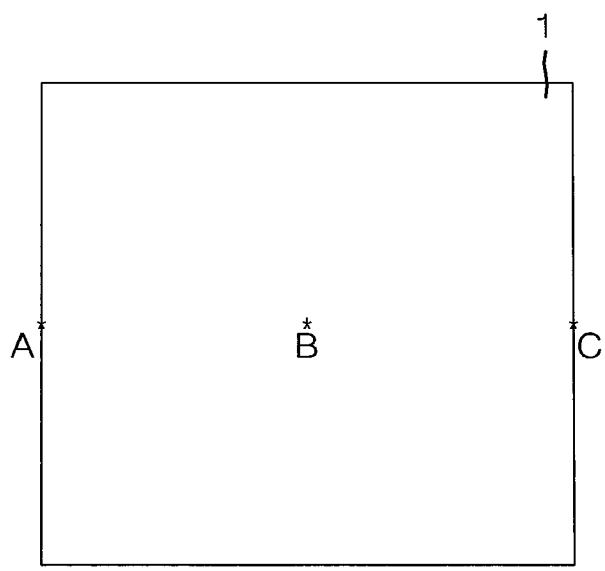
FIG. 9 is a diagram of a display screen in measurement of brightness uniformity.

As used herein, the term "brightness uniformity" is a value calculated by {(Brightness min)/(Brightness max)}× 100. Here, referring to FIG. 9, in a liquid crystal display fabricated by assembling a light source, a light guide plate, and a liquid crystal display module, brightness is measured at each of points A, B and C, wherein a central point, a left end point and a right end point of a display screen 1 are indicated by B, A and C, respectively, and a maximum brightness value (Brightness max) and a minimum brightness value (Brightness min) are obtained. In measurement of brightness, a brightness tester EZ CONTRAST X88RC (EZXL-176R-F422A4, ELDIM Co., Ltd.) is secured to the point B, and is then directed to face each of the points A, B and C. In FIGS. 9, A, B and C are placed on the same line.

As used herein, the term "(meth)acryl" refers to acryl and/or methacryl.

As used herein, the term "top portion" refers to a portion located at an uppermost portion with respect to a lowermost portion of a certain structure. Herein, the refractive index is a value measured using an Abbe refractometer at a wavelength of 550 nm.

Figure 2:
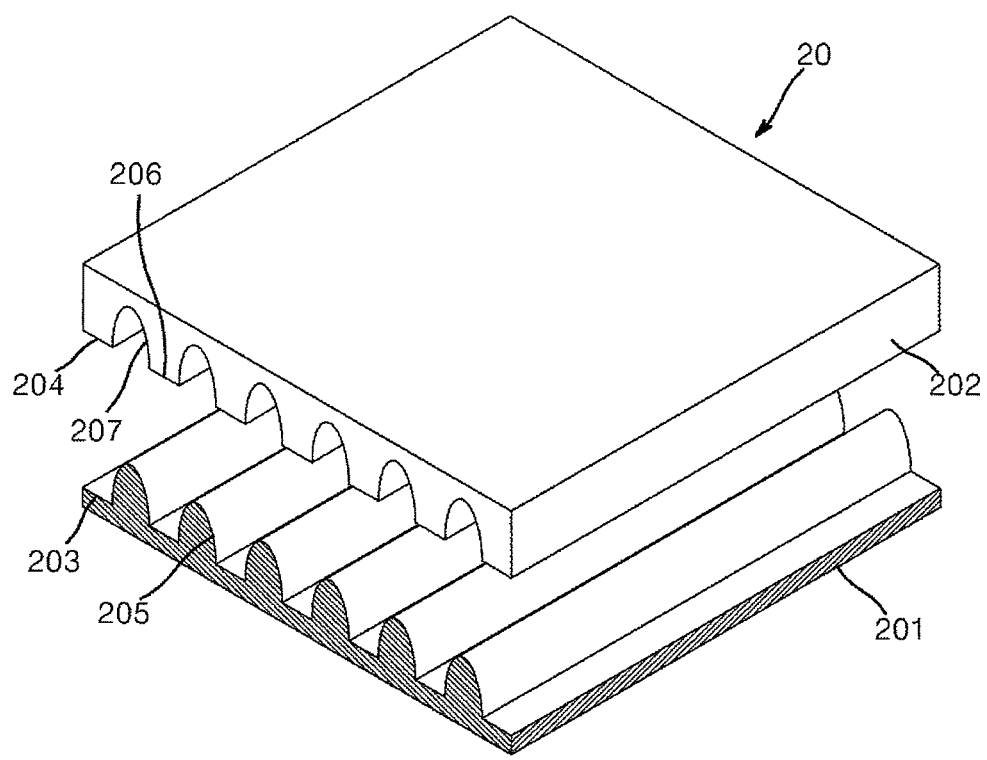
FIG. 2 is an exploded perspective view of a pattern layer of the polarizing plate shown in FIG. 1.

Hereinafter, a polarizing plate according to one example embodiment of the present invention will be described with reference to FIG. 1 and FIG. 2. FIG. 1 is a cross-sectional view of a polarizing plate according to one example embodiment of the present invention, and FIG. 2 is an exploded perspective view of a pattern layer of the polarizing plate shown in FIG. 1.

Referring to FIG. 1, a polarizing plate 100 according to one example embodiment may include a polarizer 10, a pattern layer 20, a first protective layer 30, and a bonding layer 40.

The polarizer 10 may be formed on the pattern layer 20 and may be configured to polarize light entering the polarizing plate. The polarizer 10 may include any suitable polarizer known to those skilled in the art. For example, the polarizer 10 may include a polyvinyl alcohol polarizer obtained by uniaxially stretching a polyvinyl alcohol film in the machine direction (MD) or a polyene polarizer obtained by dehydration of a polyvinyl alcohol film. The polarizer 10 may have a thickness of about 1 μm to about 60 μm, specifically about 2 μm to about 50 μm, and more specifically about 2 μm to about 30 μm. Within this thickness range, the polarizer can be used in a liquid crystal display and may be suitable for thickness reduction. Although not shown in FIG. 1, the polarizer 10 may further include an adhesive layer on a lower side thereof to facilitate adhesion of the polarizing plate 100. For example, the adhesive layer may be formed of an adhesive composition that includes adhesive resins, such as a (meth)acrylic resin, an epoxy resin, a silicone resin, and/or the like, optionally a curing agent, and optionally a silane coupling agent.

The pattern layer 20 may be formed on the polarizer 10 and may be configured to diffuse polarized light received from the polarizer 10. As a result, a liquid crystal display including the polarizing plate 100 according to the embodiment of FIG. 1 may have high contrast ratio at lateral sides of the liquid crystal display while improving viewing angle and visibility at the lateral sides thereof, and brightness uniformity. The pattern layer 20 may have a thickness of about 40 μm or less, specifically about 3 μm to about 40 μm, and more specifically about 5 μm to about 30 μm. Within this thickness range, the pattern layer can be used in a liquid crystal display and may be suitable for thickness reduction while improving viewing angle, visibility, and brightness uniformity without affecting other optical properties.

Referring to FIG. 1 and FIG. 2, the pattern layer 20 may include a high refractive index layer (or a first refractive index layer) 202 including at least one engraved pattern 207 and a low refractive index layer (or a second refractive index layer) 201 including a filling pattern 205 filling at least a portion of the engraved pattern 207.

The high refractive index layer 202 may be formed on the low refractive index layer 201 and may diffuse light which has reached the low refractive index layer 201 and is not reflected towards the filling pattern 205 by a flat portion 206, thereby significantly improving effects of collection and diffusion of light.

The high refractive index layer 202 may have a higher refractive index than the low refractive index layer 201. For example, the high refractive index layer 202 may have a refractive index of about 1.50 or more, specifically about 1.50 to about 1.65, and more specifically about 1.50 to about 1.60. Within this range, the high refractive index layer 202 can secure a good light diffusion effect. The high refractive index layer 202 may be formed of a composition for the high refractive index layer, which includes a UV-curable transparent resin having a refractive index of about 1.50 or more, specifically about 1.50 to about 1.65, and more specifically about 1.50 to about 1.60. For example, the transparent resin may include at least one of (meth)acrylic, polycarbonate, silicone, and epoxy resins, without being limited thereto. The composition for the high refractive index layer may further include a any suitable photoinitiator for formation of the high refractive index layer. A difference in refractive index between the high refractive index layer 202 and the low refractive index layer 201 (refractive index of the high refractive index layer—refractive index of the low refractive index layer) may be about 0.30 or less, specifically about 0.10 to about 0.15. Within this range, the pattern layer 20 can secure good effects of collection and diffusion of light.

The high refractive index layer 202 may further include a light diffusing agent to improve the light diffusion effect. The light diffusing agent may include an organic light diffusing agent, an inorganic light diffusing agent, or a mixture thereof. The mixture of the organic light diffusing agent and the inorganic light diffusing agent may be suitable for improvement of diffusivity and transmittance of the high refractive index layer. In the high refractive index layer 202, the light diffusing agent may be used alone or as a mixture thereof. The organic light diffusing agent may include at least one of (meth)acrylic particles, siloxane particles, and styrene particles. The inorganic light diffusing agent may include at least one of calcium carbonate, barium sulfate, titanium dioxide, aluminum hydroxide, silica, glass, talc, mica, white carbon, magnesium oxide, and zinc oxide. For example, the inorganic light diffusing agent may reduce or prevent deterioration in whiteness while further improving light diffusivity in comparison to the light diffusing agent including the organic light diffusing agent alone. The light diffusing agent is not limited to a particular shape and/or particle diameter. For example, the light diffusing agent may include spherical crosslinked particles. The light diffusing agent may have an average particle diameter (D50) of about 0.1 μm to about 30 μm, specifically about 0.5 μm to about 10 μm. Within this range, the light diffusing agent can realize the light diffusion effect, increase surface roughness of the pattern layer to have no problem with bonding strength to the first protective layer, and can secure good dispersion. For example, the light diffusing agent may be present in an amount of about 0.1 wt % to about 20 wt %, specifically about 1 wt % to about 15 wt % in the high refractive index layer. Within this range, the light diffusing agent can secure the light diffusion effect.

Referring to FIG. 2, the high refractive index layer 202 may have a first plane 204, which may include at least one flat portion 206, and at least one engraved pattern formed thereon. FIG. 2 shows the pattern layer including engraved patterns 207 and flat portions 206 alternately arranged one by one thereon. However, it should be understood that the formation sequence of the engraved patterns 207 and the flat portions 206 is not limited thereto. The engraved pattern 207 may be a lenticular lens pattern including a curved surface (e.g., a concave surface). The curved surface acts as a lens to diffuse the polarized light received from the polarizer 10 by refracting the light in various directions depending upon a light reaching location thereon. FIG. 2 shows the pattern layer 20 in which the curved surface is an aspherical surface. However, the curved surface may include a spherical surface, a parabolic surface, an oval surface, a hyperbolic surface or an amorphous surface, or may be realized in the form including both a curved surface and a flat surface. Further, although the lenticular lens pattern is illustrated as the engraved pattern 207 of the pattern layer in FIG. 2, the engraved pattern 207 may be a prism pattern having a triangular to decagonal cross-section and a curved surface at a top portion thereof. Further, although the curved surface is illustrated as having a smooth surface with no roughness in FIG. 2, the curved surface may further include roughness to improve the light diffusion effect.

Although the engraved pattern 207 is not limited to a particular aspect ratio, the engraved pattern may have an aspect ratio of, for example, about 1.0 or less, specifically about 0.4 to about 1.0, and more specifically about 0.7 to about 1.0. Within this range of aspect ratio, the engraved patterns can increase contrast ratio and viewing angle at the lateral side and brightness uniformity while reducing or minimizing variation in brightness uniformity upon increase in screen size of a liquid crystal display. Referring to FIG. 1, the aspect ratio refers to the ratio of maximum height to maximum pitch of the engraved pattern. For example, a ratio of the sum of the maximum pitches of the engraved patterns 207 to the total width of the high refractive index layer 202 may range from about 40% to about 60%, specifically about 45% to about 55%. Within these ranges of the aspect ratio and the width ratio, the engraved patterns can increase contrast ratio and viewing angle at the lateral side and brightness uniformity while minimizing variation in brightness uniformity upon increase in screen size of the liquid crystal display. Referring to FIG. 1 again, the engraved patterns 207 may have a maximum pitch (P1) of about 20 μm or less, specifically about 10 μm or less, and more specifically about 5 μm to about 10 μm. The engraved patterns 207 may have a maximum height (H1) of about 16 μm or less, specifically about 10 μm or less, and more specifically about 3.0 μm to about 10 μm. Within these ranges of pitch and height, the engraved patterns 207 can provide the light diffusion effect while suppressing a Moiré phenomenon and allowing easy machining. The engraved patterns 207 may be arranged in a cycle (e.g., a predetermined cycle), thereby further improving the light diffusion effect. For example, the engraved patterns 207 may be arranged in a cycle (C) of about 20 μm or less, specifically about 10 μm to about 20 μm. Within this range, the engraved patterns 207 can secure strong effects in collection and diffusion of light.

The flat portion 206 may be disposed between the engraved patterns 207, and diffuse light through total reflection of the light by the engraved pattern 207 when the light reaches the flat portion 206.

A ratio (P1/P2) of the maximum pitch P1 of the engraved pattern 207 to the pitch P2 of the flat portion 206 may be about 1 or less, specifically about 0.5 to about 1.0. Within this range, the high refractive index layer can secure high effects in collection and diffusion of light, while suppressing the Moiré phenomenon. For example, the flat portion 206 may have a pitch (P2) of about 10 μm or less, specifically about 5 μm to about 10 μm. Within this range, the flat portion can improve contrast ratio while suppressing the Moiré phenomenon.

The low refractive index layer 201 may be formed on the polarizer 10 and diffuse the polarized light by refracting the light in various directions depending upon a light incident location upon receiving the light in one direction from the polarizer 10.

For example, the low refractive index layer 201 may have a refractive index of less than about 1.50, specifically about 1.35 to less than about 1.50, and more specifically about 1.35 to about 1.49. Within this range, the low refractive index layer 201 can provide a high light diffusion effect and can facilitate fabrication of the pattern layer. The low refractive index layer 201 may be formed of a composition for the low refractive index layer, which includes a UV-curable transparent resin having a refractive index of less than about 1.50, specifically about 1.35 to less than about 1.50, and more specifically about 1.35 to about 1.49. For example, the transparent resin may include at least one of (meth)acrylic, polycarbonate, silicone, and epoxy resins, without being limited thereto. The composition for the low refractive index layer may further include any suitable photoinitiator for formation of the low refractive index layer. Referring to FIG. 2 again, the low refractive index layer 201 may include a second plane 203 facing the first plane 204 of the high refractive index layer 202 and including at least one filling pattern 205. The filling pattern 205 may fill at least a portion of the engraved pattern 207 of the high refractive index layer 202. As used herein, the expression "fill at least a portion" includes both a structure wherein the filling pattern completely fills the engraved pattern 207 and a structure wherein the filling pattern partially fills the engraved pattern 207. In the structure wherein the filling pattern partially fills the engraved pattern, a remaining and not-filled (or unfilled) portion of the engraved pattern may be filled with air or a resin (e.g., resin having a predetermined refractive index). For example, the resin may have a refractive index which is the same as or higher than that of the low refractive index layer and is the same as or lower than that of the high refractive index layer. Although FIG. 2 shows the pattern layer in which the filling pattern 205 and the engraved pattern 207 extend in a stripe shape, the filling pattern 205 and the engraved pattern 207 may be formed in a dot shape in some example embodiments. As used herein, the term "dot" means that combinations of the filling patterns and the engraved patterns are dispersed. The low refractive index layer 201 may also further include the light diffusing agent described above. The light diffusing agent may be present in an amount of about 0.1 wt % to about 20 wt %, specifically about 1 wt % to about 15 wt % in the low refractive index layer. Within this range, the light diffusing agent can secure the light diffusion effect.

Although FIG. 1 and FIG. 2 show the pattern layer 20 that includes the high refractive index layer 202 including at least one engraved pattern 207 formed thereon and the low refractive index layer 201 including the filling pattern 205 filling at least a portion of the engraved pattern 207, the pattern layer may include a low refractive index layer having at least one engraved pattern 207 and a high refractive index layer including a filling pattern 205 filling at least a portion of the engraved pattern 207.

Next, the first protective layer 30 will be described.

Referring to FIG. 1 again, the first protective layer 30 may be formed on the high refractive index layer 202 to protect the pattern layer 20 and the polarizer 10. Although FIG. 1 shows the structure in which the polarizer 10, the bonding layer 40, the low refractive index layer 201, the high refractive index layer 202, and the first protective layer 30 are sequentially stacked in that order, embodiments of the present invention may also include a structure in which the polarizer 10, the bonding layer 40, the first protective layer 30, the low refractive index layer 201, and the high refractive index layer 202 are sequentially stacked in that order.

The first protective layer 30 may be integrated with the pattern layer 20. As used herein, the term "integrated" means a state in which the first protective layer 30 and the pattern layer 20 are not independently separated from each other. For example, the first protective layer 30 may be directly formed on the high refractive index layer 202 without a bonding agent interposed therebetween. For example, the high refractive index layer 202 may be a coating layer formed by coating the composition for the high refractive index layer on the first protective layer 30. The first protective layer 30 may have a thickness of about 150 μm or less, specifically about 20 μm to about 150 μm, and more specifically about 30 μm to about 100 μm. Within this thickness range, the first protective layer 30 may be used in a liquid crystal display. For example, the ratio of the thickness of the pattern layer 20 to the thickness of the first protective layer 30 (thickness of the pattern layer/thickness of the first protective layer) may be about 2 or less, specifically about 0.02 to about 0.75, and more specifically about 0.1 to about 0.4. Within this range, the first protective layer can prevent or reduce deterioration in reliability due to permeation of external moisture into the polarizing plate while suppressing curling and wrinkling of the polarizing plate. For example, the first protective layer 30 may have a light transmittance of about 90% or more at a wavelength of 550 nm, specifically about 90% to about 99%. Within this range, when mounted on the polarizer, the first protective layer can increase transmittance of the polarizing plate to reduce or eliminate requirements for increase in transmittance of the polarizer, thereby further improving the degree of polarization of the polarizer. The first protective layer 30 may include a base film formed of an optically transparent resin. For example, the resin may include at least one selected from among polyesters, such as polyethylene terephthalate (PET), polybutylene terephthalate, polyethylene naphthalate, and polybutylene naphthalate, acryl resins, cyclic olefin polymer (COP) resins, cellulose resins including triacetylcellulose (TAC), and the like. The first protective layer 30 may include a base film formed by modification of the aforementioned resins. Modification may include copolymerization, branching, crosslinking, or modification of terminal molecules. In one example embodiment, the first protective layer 30 may have an in-plane retardation (Re) of about 8,000 nm or more, about 10,000 nm or more, higher than specifically about 10,000 nm, more specifically about 10,100 nm to about 50,000 nm, and still more specifically about 10,100 nm to about 15,000 nm. Within this range, the first protective layer 30 can prevent or substantially prevent rainbow spots from being visible, reduce or suppress rainbow mura, reduce or minimize light leakage at lateral sides of a liquid crystal display, and/or reduce or prevent variation in retardation depending upon incidence angle of light. The first protective layer 30 may have an out-of-plane retardation (Rth) of about 15,000 nm or less, specifically about 10,000 nm to about 12,000 nm. The first protective layer 30 may have a difference value nx−ny of about 0.1 to about 0.2. Within this range, the first protective layer 30 can reduce or prevent generation of rainbow spots by suppressing variation in retardation depending on incidence angle and wavelengths of light. For example, the first protective layer 30 may have a degree of biaxiality (NZ) of about 1.8 or less, specifically about 1.5 to about 1.8, and more specifically about 1.5 to about 1.7. Within this range, the first protective layer 30 can reduce or prevent generation of rainbow spots, reduce or minimize light leakage at the lateral sides of the liquid crystal display, reduce or prevent variation in retardation depending upon incidence angle of light, and/or reduce or suppress variation in retardation depending on wavelengths of light. For example, for the first protective layer 30, a ratio (Rth/Re) of out-of-plane retardation to in-plane retardation (Re) may be about 1.3 or less, specifically about 1.0 to about 1.2. Within this range, the first protective layer 30 can reduce or prevent generation of rainbow spots.

Although not shown in FIG. 1, the first protective layer 30 may include a base film and a primer layer formed on at least one surface of the base film. The base film may support the first protective layer 30 and may have a refractive index ratio (e.g., a refractive index ratio in a predetermined range) with respect to the primer layer, thereby improving transmittance of the first protective layer 30. For example, a refractive index ratio of the primer layer to the base film (refractive index of the primer layer/refractive index of the base film) may be about 1.0 or less, specifically about 0.6 to about 1.0, more specifically about 0.69 to about 0.95, still more specifically about 0.7 to about 0.9, and still more specifically about 0.72 to about 0.88. Within this range, the base film can increase or improve transmittance of the first protective layer. For example, the base film may have a refractive index of about 1.3 to about 1.7, specifically about 1.4 to about 1.6. Within this range, the base film can be applied to the first protective layer of the polarizing plate, can facilitate regulation of the refractive index with respect to the primer layer, and can improve transmittance of the first protective layer. For example, the base film may have an in-plane retardation (Re) of about 8,000 nm or more, about 10,000 nm or more, specifically higher than about 10,000 nm, more specifically about 10,100 nm to about 50,000 nm, and still more specifically about 10,100 nm to about 15,000 nm. Within this range, the base film can reduce or prevent generation of rainbow spots, reduce or suppress rainbow mura, reduce or minimize light leakage at lateral sides of a liquid crystal display, and/or reduce or minimize variation in retardation depending upon incidence angle and wavelengths of light. For example, the base film may have an out-of-plane retardation (Rth) of about 15,000 nm or less, specifically about 10,000 nm to about 12,000 nm. The base film may have a difference value nx−ny of about 0.1 to about 0.2. Within this range, the base film can reduce or prevent generation of rainbow spots by reducing or minimizing variation in retardation depending upon incidence angle and wavelengths of light. For example, the base film may have a degree of biaxiality (NZ) of about 1.8 or less, specifically about 1.5 to about 1.8, and more specifically about 1.5 to about 1.7. Within this range, the base film can reduce or prevent generation of rainbow spots and light leakage at the lateral sides of the liquid crystal display, and/or reduce or minimize variation in retardation depending upon incidence angle and wavelengths of light. For example, for the base film, a ratio (Rth/Re) of out-of-plane retardation (Rth) to in-plane retardation (Re) may be about 1.3 or less, specifically about 1.0 to about 1.2. Within this range, the base film can reduce or prevent generation of rainbow spots. For example, the base film may have a thickness of about 150 µm or less, specifically about 20 µm to about 150 µm, and more specifically about 30 µm to about 100 µm. Within this range, the base film can be applied to the first protective layer. The base film may be obtained by uniaxially stretching a film formed of an optically transparent resin. For example, the resin may include at least one selected from among polyesters, such as polyethylene terephthalate (PET), polybutylene terephthalate, polyethylene naphthalate, and polybutylene naphthalate, acryl resins, cyclic olefin polymer (COP) resins, cellulose resins including triacetylcellulose (TAC), and the like. For example, the base film may be formed of a polyethylene terephthalate resin to increase strength of the base film, thereby improving processability of the polarizing plate. The primer layer is formed between the base film and the pattern layer 20 to be disposed directly on (an upper side) the pattern layer 20 and reinforces adhesion between the base film and the pattern layer 20. For example, the primer layer may have a refractive index of about 1.0 to about 1.6, specifically about 1.1 to about 1.6, and more specifically about 1.1 to about 1.5. Within this range of refractive index, the primer layer can be used in the polarizing plate and exhibit a suitable refractive index with respect to the refractive index of the base film, thereby improving transmittance of the first protective layer. For example, the primer layer may have a thickness of about 1 nm to about 200 nm, specifically about 60 nm to about 200 nm. Within this thickness range, the primer layer can be used in the polarizing plate and can exhibit a suitable refractive index with respect to the refractive index of the base film, thereby improving or increasing transmittance of the first protective layer without suffering from brittleness. The primer layer may be a non-urethane primer layer free from a urethane group. For example, the primer layer may be formed of a composition for the primer layer including resins, such as a polyester resin and an acryl resin, and monomers. The primer layer can secure the above refractive index by adjusting a mixing ratio of these monomers (for example: molar ratio). The composition for the primer layer may further include at least one additive such as a UV absorbent, an antistatic agent, an antifoaming agent, a surfactant, and/or the like. For example, the first protective layer 30 may be formed by forming the primer layer on at least one surface of the base film, followed by uniaxially stretching the film to about 2 to 10 times an initial length thereof only in the transverse direction (TD). Alternatively, the first protective layer 30 may be formed by uniaxially stretching the melt-extruded film to about 2 to 10 times an initial length thereof, heat treating the stretched film (e.g., heat treating the stretched film in a predetermined temperature range), and stretching the heat treated film under tension relaxation conditions in the TD. For example, the heat treatment may be performed at the glass transition temperature Tg of the resin, specifically about 100° C. to about 300° C. for about 1 second to about 2 hours. For example, TD elongation may be about 0 times to about 3 times, specifically about 0.1 times to about 2 times, and more specifically about 0.1 times to about 1 times. Within these ranges of temperature and elongation, the protective film can maintain retardation and can achieve crystallization and stabilization of the first protective layer.

In some example embodiments, the first protective layer 30 is a TD uniaxially stretched film as described above and the polarizer 10 is an MD uniaxially stretched film. In the polarizing plate 100, the TD of the first protective layer 30 may be substantially orthogonal to the MD of the polarizer 10. As a result, it is possible to prevent or substantially prevent the polarizing plate 100 from suffering from warpage. As used herein, "substantially orthogonal to" may include not only a structure where the TD of the first protective film 30 and the MD of the polarizer 10 cross each other, but also a structure where the TD of the protective film 30 and the MD of the polarizer 10 cross each other at a certain angle within an acceptable margin of error from 90°.

Although not shown in FIG. 1, the first protective layer 30 may further include a functional layer (e.g., a functional coating layer) on one surface thereof. The functional layer can provide at least one of anti-reflection, low reflection, hard coating, anti-glare, anti-fingerprint, anti-contamination, diffusion and refraction functions to the first protective layer 30. In one example embodiment, the functional layer may be formed as an independent layer on the first protective layer 30. For example, the functional layer may be formed on the first protective layer 30 by coating a composition for the functional layer on the first protective layer 30, or through a bonding layer or an adhesive layer. In another example embodiment, the functional layer may be realized by one surface of the first protective layer 30.

Next, the bonding layer 40 will be described.

The bonding layer 40 may be formed between the polarizer 10 and the pattern layer 20 to bond the polarizer 10 to the pattern layer 20. The bonding layer 40 may be formed of any suitable composition for the bonding layer. In one example embodiment, the composition for the bonding layer may include an epoxy resin, a (meth)acrylic monomer, a radical photoinitiator, and a cationic photoinitiator. In another example embodiment, the composition for the bonding layer may include a water-based polyvinyl alcohol bonding agent. For example, the composition for the bonding layer may further include the aforementioned light diffusing agent to further improve the light diffusion effect. For example, the bonding layer 40 may have a thickness of about 1 µm to about 20 µm, specifically about 1 µm to about 10 µm, and more specifically about 1 µm to about 5 µm. Within this thickness range, the bonding layer can exhibit good bonding strength and facilitate thickness reduction of the polarizing plate. However, if the patter layer 20 exhibits adhesive properties, the bonding layer 40 can be excluded.

Figure 3:
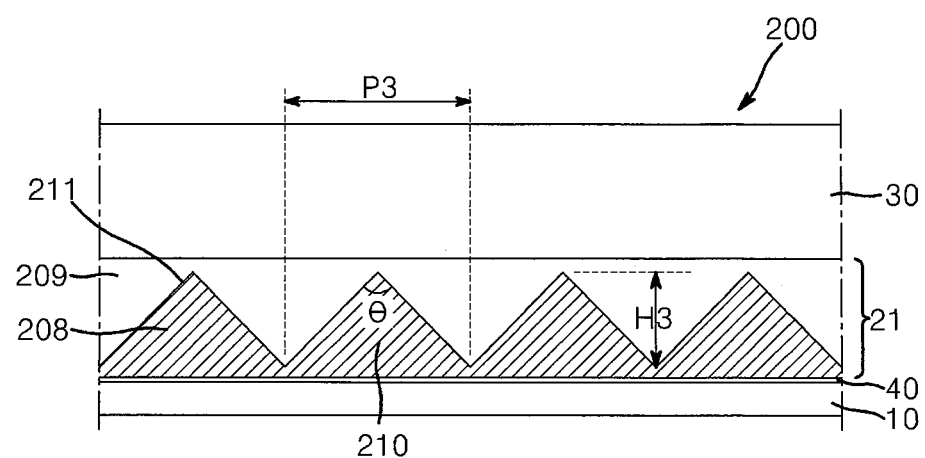
FIG. 3 is a cross-sectional view of a polarizing plate according to another example embodiment of the present invention.

Next, a polarizing plate according to another example embodiment will be described with reference to FIG. 3. FIG. 3 is a cross-sectional view of a polarizing plate according to another example embodiment.

Referring to FIG. 3, a polarizing plate 200 according to another example embodiment is substantially the same as the polarizing plate 100 according to the embodiment illustrated in FIG. 1 except that the polarizing plate 200 includes a pattern layer 21 instead of the pattern layer 20 to reduce the ratio of width of the engraved pattern to width of the pattern layer 20, thereby reducing or suppressing the Moiré phenomenon, and can reduce the height of the engraved pattern, thereby enabling thickness reduction of the pattern layer. The pattern layer 21 may be formed on the polarizer 10 and can diffuse polarized light received from the polarizer 10. As a result, the pattern layer 21 can improve contrast ratio and viewing angle at the lateral side and visibility, and brightness uniformity.

Referring to FIG. 3, the pattern layer 21 may include a high refractive index layer 209 including at least one engraved prism pattern 211 and a low refractive index layer 208 including at least one filling pattern 210 filling at least a portion of the engraved prism pattern 211. FIG. 3 shows the polarizing plate which includes engraved prism patterns 211 having a triangular cross-section. Alternatively, the polarizing plate has an engraved prism pattern having an n-gonal cross-section (n being an integer from 4 to 10). In addition, the polarizing plate according to the embodiment illustrated in FIG. 3 does not include a flat portion between the engraved prism patterns 211. According to some example embodiments, the polarizing plate may further include the flat portion of FIG. 1 between the engraved prism patterns 211 of FIG. 3. In addition, roughness may be further formed on the engraved prism pattern 211 shown in FIG. 3 to further improve the light diffusion effect. For example, the engraved prism pattern 211 may have a maximum pitch (P3) of about 20 μm or less, specifically about 7 μm to about 15 μm. For example, the engraved prism pattern 211 may have a maximum height (H3) of about 3 μm to about 16 μm, specifically about 4 μm to about 16 μm. For example, the engraved prism pattern 211 may have a vertex angle (θ) of about 55° to about 90°, specifically about 65° to about 80°. Although the engraved prism pattern 211 is not limited to a particular aspect ratio, the engraved prism pattern 211 may have an aspect ratio of, for example, about 1 or less, specifically about 0.50 to about 0.96, and more specifically about 0.6 to about 0.8. Within these ranges of the pitch, height, vertex angle and aspect ratio, the engraved prism pattern 211 can secure good effect of light collection and diffusion.

Figure 4:
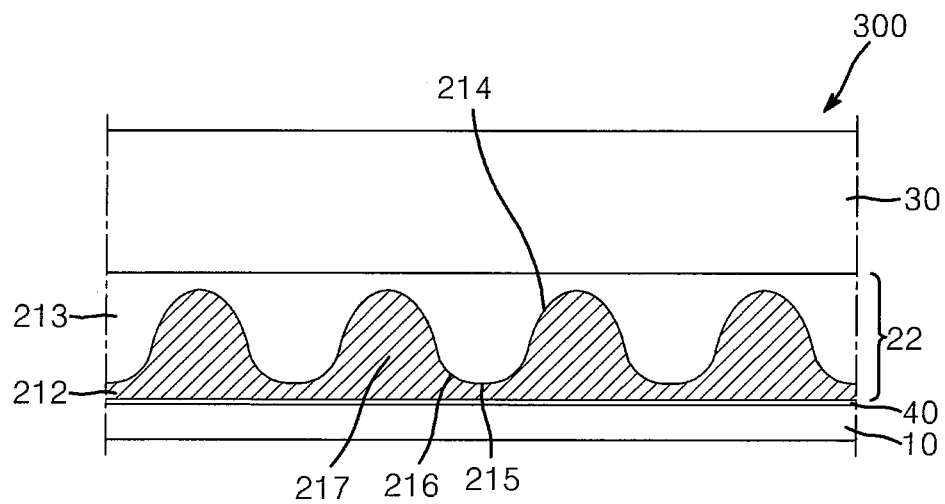
FIG. 4 is a cross-sectional view of a polarizing plate according to a further example embodiment of the present invention.

Next, a polarizing plate according to a further example embodiment will be described with reference to FIG. 4. FIG. 4 is a cross-sectional view of a polarizing plate according to a further example embodiment.

Referring to FIG. 4, a polarizing plate 300 according to a further example embodiment is substantially the same as the polarizing plate 100 according to the embodiment illustrated in FIG. 1 except that the polarizing plate 200 includes a pattern layer 22 instead of the pattern layer 20. The pattern layer 22 may include a low refractive index layer 212 and a high refractive index layer 213. The high refractive index layer 213 may include at least one engraved pattern 214 and at least one flat portion 215, and may have a curved surface 216 formed at an interface between the engraved pattern 214 and the flat portion 215 to provide further improved effects of collection and diffusion of light. The low refractive index layer 212 may include at least one filling pattern 217 that fills at least a portion of the engraved pattern 214.

Figure 5:
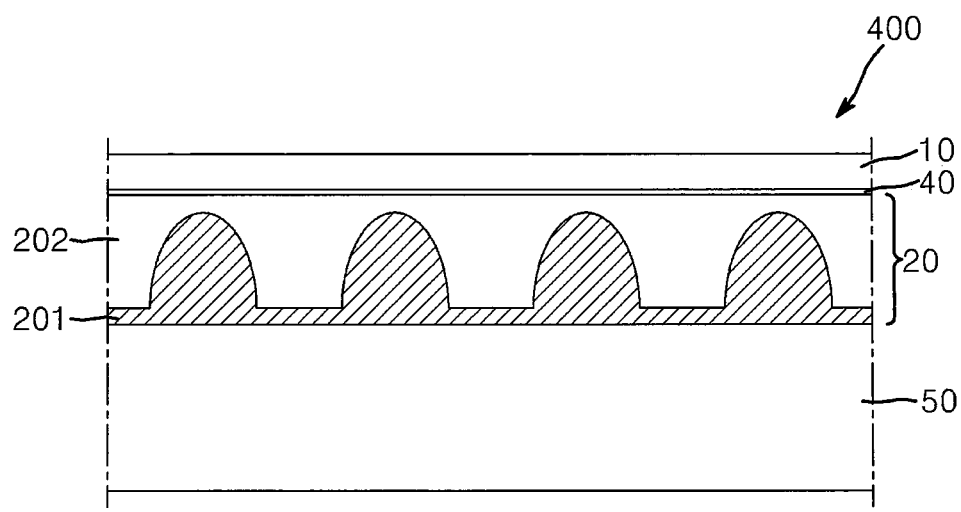
FIG. 5 is a cross-sectional view of a polarizing plate according to yet another example embodiment of the present invention.

Next, a polarizing plate according to yet another example embodiment will be described with reference to FIG. 5. FIG. 5 is a cross-sectional view of a polarizing plate according to yet another example embodiment.

Referring to FIG. 5, a polarizing plate 400 according to yet another example embodiment is substantially the same as the polarizing plate 100 according to the embodiment illustrated in FIG. 1 except that the polarizing plate 400 includes a second protective layer 50, instead of the first protective layer 30, and a high refractive index layer 202 is formed between the bonding layer 40 and the low refractive index layer 201. Although not shown in FIG. 5, the polarizing plate 400 according to some example embodiments may further include a bonding layer 40 and a first protective layer 30 sequentially formed on the polarizer 10, i.e. the first protective layer 30, the bonding layer 40, the polarizer 10, the bonding layer 40, the high refractive index layer 202, the low refractive index layer 201, and the second protective layer 50 may be sequentially formed. In some example embodiments, the polarizing plate 400 may include the pattern layer 21 instead of the pattern layer 20. The following description will be given of the second protective layer 50 only.

For example, the second protective layer 50 may be formed under the low refractive index layer 201 to support the pattern layer 20.

The second protective layer 50 may be formed of an optically transparent resin. For example, the resin may include at least one of TAC, PET, COP, and an acrylic resin. More specifically, the resin may include TAC, COP, and an acrylic resin. The second protective layer 50 may include a film formed by modification of the aforementioned resins. Modification may include copolymerization, branching, crosslinking, or modification of terminal molecules.

The second protective layer 50 may have a range (e.g., a predetermined range) of retardation to provide a viewing angle compensation function. In one example embodiment, the second protective layer 40 may have an in-plane retardation (Re) of about 40 nm to about 60 nm. In another example embodiment, the second protective layer 40 may have the same retardation as the first protective layer described above. Within this range, the second protective layer can compensate viewing angle to provide good image quality. For example, the second protective layer 50 may have a thickness of about 150 μm or less, specifically about 20 μm to about 150 μm, and more specifically about 30 μm to about 100 μm. Within this range, the second protective layer can be used in the polarizing plate. For example, the ratio of thickness of the pattern layer 20 to thickness of the second protective layer 50 (thickness of the pattern layer/thickness of the second protective layer) may be about 2 or less, specifically about 0.02 to about 0.75, and more specifically about 0.1 to about 0.4. Within this range, the second protective layer can reduce or prevent deterioration in reliability due to permeation of external moisture into the polarizing plate while reducing or suppressing curling and wrinkling of the polarizing plate.

Figure 6:
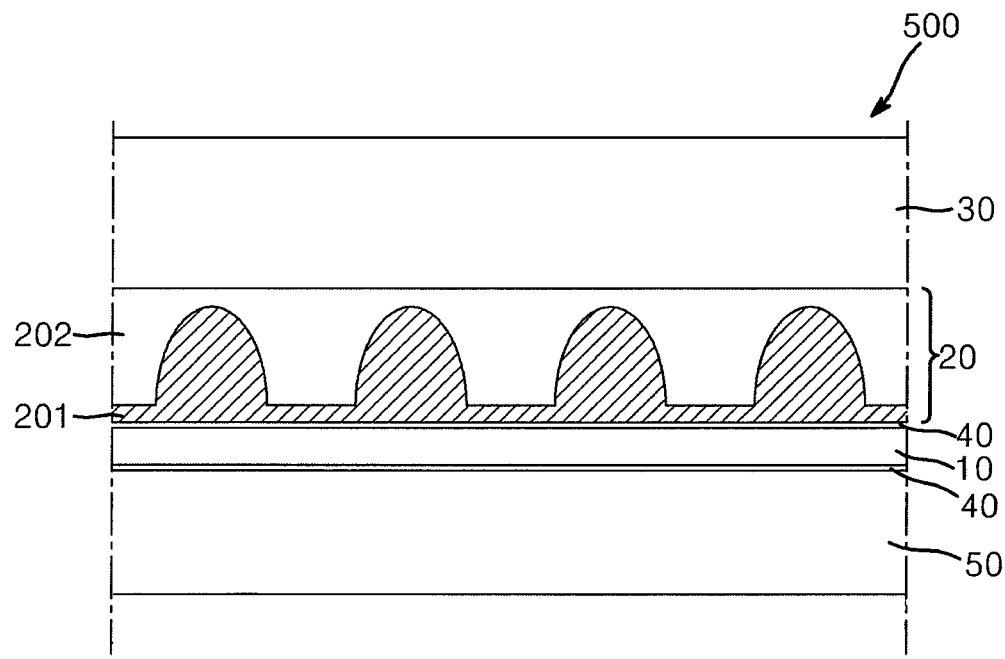
FIG. 6 is a cross-sectional view of a polarizing plate according to yet another example embodiment of the present invention.

Next, a polarizing plate according to yet another example embodiment will be described with reference to FIG. 6. FIG. 6 is a cross-sectional view of a polarizing plate according to yet another example embodiment.

Referring to FIG. 6, a polarizing plate 500 according to yet another example embodiment is substantially the same as the polarizing plate 100 according to the embodiment illustrated in FIG. 5 except that a bonding layer 40 and a second protective layer 50 are further sequentially formed under the polarizer 10. The bonding layer 40 and the second protective layer 50 can further reduce or suppress warpage of the polarizing plate. Although FIG. 6 shows the polarizing plate having a structure wherein the bonding layer 40 formed between the polarizer 10 and the pattern layer 20 is the same as the bonding layer 40 formed between the polarizer 10 and the second protective layer 50, it should be understood that the bonding layer 40 formed between the polarizer 10 and the pattern layer 20 may be different from the bonding layer formed between the polarizer 10 and the second protective layer 50 in terms of thickness, composition, and/or the like. Although the polarizing plate according to the embodiment shown in FIG. 6 includes the pattern layer 20, the polarizing plate in some embodiments may include the pattern layer 21 instead of the pattern layer 20. Although not shown in FIG. 6, the polarizing plate according to some embodiments may further include an adhesive layer under the second protective layer 50. The adhesive layer may be formed of an adhesive composition that includes adhesive resins such as a (meth)acrylic resin, an epoxy resin, a silicone resin, and/or the like, a curing agent, and/or a silane coupling agent. The (meth)acrylic resin may include a typical (meth)acrylic copolymer containing an alkyl group, a hydroxyl group, an aromatic group, a carboxylic acid group, an alicyclic group, a hetero-alicyclic group, and/or the like. For example, the (meth)acrylic resin may be formed of a monomer mixture including a (meth)acrylic monomer containing a $C_1$ to $C_{10}$ unsubstituted alky group, a (meth)acrylic monomer containing a $C_1$ to $C_{10}$ alkyl group having at least one hydroxyl group, a (meth)acrylic monomer containing a $C_6$ to $C_{20}$ aromatic group, a (meth)acrylic monomer containing a carboxylic acid group, a (meth) acrylic monomer containing a $C_3$ to $C_{20}$ alicyclic group, and/or a (meth)acrylic monomer containing a $C_3$ to $C_{10}$ hetero-alicyclic group having at least one of nitrogen (N), oxygen (O) and sulfur (S). The curing agent may include polyfunctional (meth)acrylates including bi-functional (meth)acrylates such as hexanediol diacrylate; tri-functional (meth)acrylates such as trimethylolpropane tri(meth)acrylate; tetra-functional (meth)acrylates such as pentaerythritol tetra(meth)acrylate; penta-functional (meth)acrylates such as dipentaerythritol penta(meth)acrylate; and/or hexa-functional (meth)acrylates such as dipentaerythritol hexa(meth) acrylate, without being limited thereto. The silane coupling agent may include a typical silane coupling agent such as 3-glycidoxypropyltrimethoxysilane. As used in preparation of the adhesive layer, the adhesive composition may include 100 parts by weight of the (meth)acrylic resin, about 0.1 parts by weight to about 30 parts by weight of the curing agent, and about 0.1 parts by weight to about 20 parts by weight of the silane coupling agent. With this content of the adhesive composition, the adhesive layer may allow the polarizing plate to be efficiently attached to a liquid crystal panel. For example, the adhesive layer may have a thickness of about 10 μm to about 100 μm. Within this thickness range, the adhesive layer may allow the polarizing plate to be efficiently attached to a liquid crystal panel and can be used in the polarizing plate.

Figure 7:
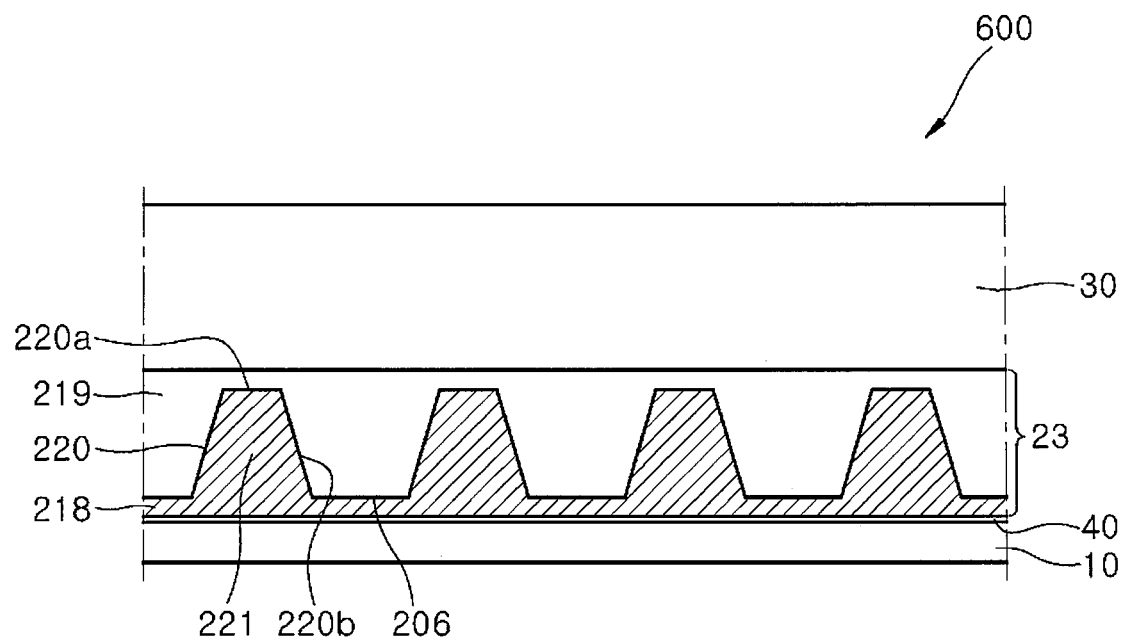
FIG. 7 is a cross-sectional view of a polarizing plate according to yet another example embodiment of the present invention.

Next, a polarizing plate according to yet another example embodiment will be described with reference to FIG. 7. FIG. 7 is a cross-sectional view of a polarizing plate according to yet another example embodiment.

Referring to FIG. 7, a polarizing plate 600 according to yet another example embodiment is substantially the same as the polarizing plate 100 according to the embodiment illustrated in FIG. 1 except that the polarizing plate 600 includes a pattern layer 23 instead of the pattern layer 20.

Referring to FIG. 7, the pattern layer 23 may include a high refractive index layer 219 including at least one engraved pattern 220 and a flat portion 206, and a low refractive index layer 218 including a filling pattern 221 filling at least a portion of the engraved pattern 220. The engraved pattern 220 may be an engraved optical pattern including a flat surface 220a at an uppermost surface thereof. The flat surface 220a is formed at the uppermost surface of the engraved pattern and promotes diffusion of light emitted from an optical display and reaching the low refractive index layer 218, thereby increasing or improving viewing angle and brightness. Accordingly, the polarizing plate 600 can reduce or minimize brightness loss through improvement in light diffusion effect and can improve visibility by increasing ½ viewing angle or ⅓ viewing angle. The flat surface 220a may be parallel to one surface of the polarizer 10, the flat portion 206 and/or the first protective layer 30. Referring to FIG. 7 again, the engraved pattern 220 has a trapezoidal cross-sectional shape in which one flat surface 220a is formed at the uppermost surface thereof and inclined surfaces 220b are flat (for example: a truncated prism pattern having a truncated triangular cross-section, that is, a truncated prism shape). Alternatively, in some embodiments, the engraved pattern 220 may have a shape in which one or more flat surfaces are formed at the uppermost surface thereof and an inclined surface is a curved surface (for example: a truncated lenticular lens pattern or a truncated micro-lens pattern), or a shape including one or more flat surfaces at the uppermost surface thereof and having an n-gonal cross-section (n being an integer that is greater than or equal to 5, specifically 5 to 20).

Figure 8:
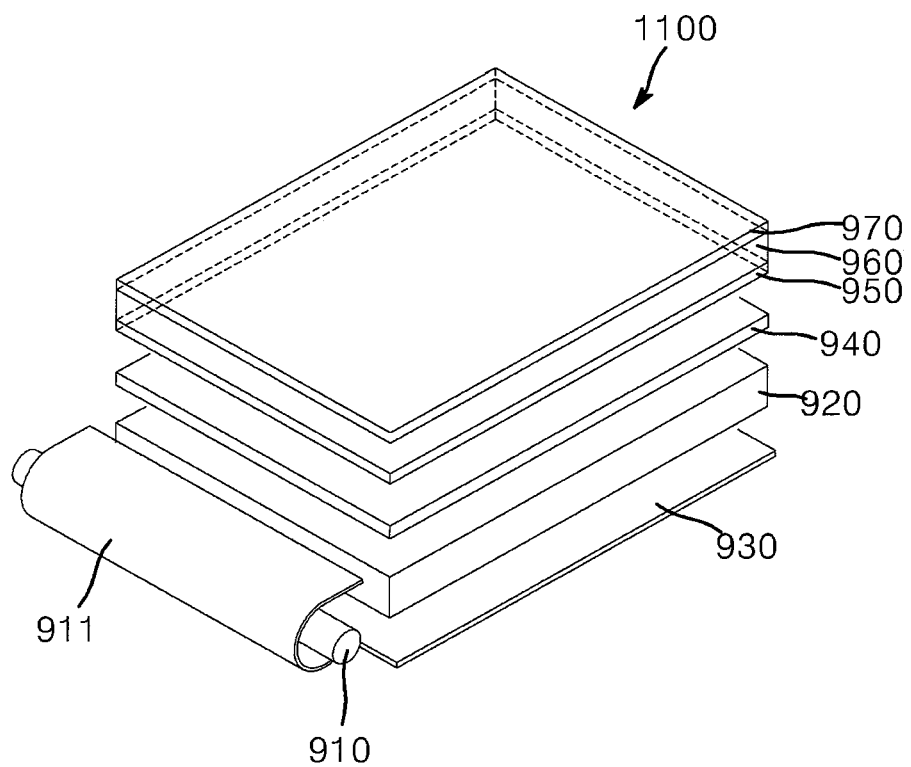
FIG. 8 is a perspective view of a liquid crystal display according to one example embodiment of the present invention.

Next, a liquid crystal display according to one example embodiment of the present invention will be described with reference to FIG. 8. FIG. 8 is a perspective view of a liquid crystal display according to one example embodiment of the present invention.

Referring to FIG. 8, a liquid crystal display 1100 according to one example embodiment may include a light source 910, a light guide plate 920, a reflective sheet 930, a diffusive sheet 940, a first polarizing plate 950, a liquid crystal panel 960, and a second polarizing plate 970, in which the second polarizing plate 970 may include the polarizing plate according to example embodiments of the present invention.

The light source 910 may generate light and may be disposed to face the light guide plate 920. The light source 910 may be a linear light lamp, a surface light lamp, and/or any other suitable light sources such as CCFL or LED. A light source cover 911 may be further disposed outside the light source 910. Although the light source 910 is disposed only at one side of the light guide plate 920 in the embodiment of FIG. 8, the light source 910 in some embodiments may also be further disposed at the other side of the light guide plate 920 (at a side of the light guide plate 920 opposite to the one side of the light guide plate 920) and may be a direct type light source.

The light guide plate 920 may be disposed at a lateral side of the light source 910 and may internally reflect light received from the light source 910 to be directed towards the diffusive sheet 940.

The diffusive sheet 940 may diffuse the light received from the light guide plate 920 to supply the light to the first polarizing plate 950. The diffusive sheet 940 may include a prism sheet having an optical pattern formed on a light incidence plane thereof, a prism sheet having an optical pattern formed on a light exit plane thereof, and/or the like. The diffusive sheet 940 may include a composite optical sheet having two or more prism sheets stacked thereon.

The liquid crystal panel 960 may be disposed between the first polarizing plate 950 and the second polarizing plate 970 and may be configured to allow light received from the first polarizing plate 950 to be transmitted to the second polarizing plate 970 therethrough.

The liquid crystal panel 960 may include a first substrate, a second substrate, and a liquid crystal layer secured between the first substrate and the second substrate and acting (operating or functioning) as a display medium. The first substrate may include a color filter and a black matrix mounted thereon. The second substrate may include a switching device configured to control electro-optical characteristics of liquid crystals, an injection line configured to supply gate signals to the switching device and a signal line in order to provide a source signal, a pixel electrode, and a counter electrode. The liquid crystal layer may include liquid crystals evenly aligned upon application of no electric field. For example, the liquid crystal panel may adopt a vertical alignment (VA) mode, a patterned vertical alignment (PVA) mode, or a super-patterned vertical alignment (S-PVA) mode, without being limited thereto.

The first polarizing plate 950 may be disposed on one surface of the liquid crystal panel 960 to face the light exit plane of the diffusive sheet 940 and may be configured to polarize and diffuse light received from the diffusive sheet 940 towards the liquid crystal panel 960. The first polarizing plate 950 may include a polarizer and a protective film formed on at least one surface of the polarizer. The polarizer and the protective film are well known to those skilled in the art.

The reflective sheet 930 may be formed on a lower surface of the light guide plate 920 and may reflect light emitted from the light source 910 to the light guide plate 920, thereby improving luminous efficacy.

Although the second polarizing plate 970 may be illustrated as including the polarizing plate according to the embodiments of the present invention in FIG. 8, the first polarizing plate 950 may include the polarizing plate according to some embodiments instead of the second polarizing plate 970.

Next, a method of fabricating a polarizing plate according to one example embodiment of the present invention will be described.

The polarizing plate according to this embodiment may be fabricated by assembling a stack structure of a first protective layer and a pattern layer on a polarizer.

First, the stack structure of the first protective layer and the pattern layer is fabricated. For example, the composition for the high refractive index layer is coated onto one surface of the first protective layer. For example, the composition may be coated to a thickness of about 40 µm or less, specifically about 3 µm to about 40 µm, and more specifically about 5 µm to about 30 µm. Coating is not limited to a particular method, and any suitable coating method known to one skilled in the art may be used. For example, coating may be performed by bar coating, die coating, slip coating, and/or the like. A high refractive index layer is formed by transferring a pattern to the coating layer using a pattern film having an embossed filling pattern and a flat portion formed thereon. Thereafter, a composition for a low refractive index layer is coated onto the pattern so as to fill the pattern and is cured, thereby forming a low refractive index layer. For example, curing may be performed by at least one of photocuring or heat curing. Photocuring may be performed using light at a wavelength of 400 nm or less at a fluence of about 10 mJ/cm$^2$ to about 1000 mJ/cm$^2$. Heat curing may be performed at about 40° C. to about 200° C. for about 1 hour to about 30 hours. Under these conditions, the resin or composition for the pattern layer can be sufficiently cured, thereby increasing hardness of the pattern layer. According to this method, the pattern layer is a coating layer formed on the first protective layer and may directly contact the first protective layer. Thereafter, a composition for a bonding layer is coated onto one surface of the pattern layer, bonded to the polarizer, and cured, thereby fabricating a polarizing plate.

Hereinafter, example embodiments of the present invention will be described in more detail with reference to some examples. However, it should be understood that these examples are provided for illustration only and are not to be construed in any way as limiting the present invention.

Example 1: Manufacture of Polarizing Plate

A polarizer was manufactured by stretching a polyvinyl alcohol film at 60° C. to 3 times an initial length thereof and adsorbing iodine to the stretched film, followed by stretching the resulting film to 2.5 times the stretched length of the film in an aqueous solution of boric acid at 40° C.

A coating layer was formed by coating a UV-curable resin (SSC155, Shin-A T&C) onto one surface of a transparent PET film (COSMOSHINE SRF, thickness: 80 µm, Re=14,000 nm at a wavelength of 550 nm, Toyobo Co., Ltd.) for a first protective layer. Using a film having an embossed lenticular lens pattern (pitch: 10 µm, height: 10 µm) and a flat portion (pitch: 10 µm) alternately formed thereon, an engraved lenticular lens pattern and a flat portion were formed on the coating layer, followed by curing, thereby forming a high refractive index layer on the PET film. Then, a UV-curable resin (SSC140, Shin-A T&C) was coated onto the high refractive index layer such that the engraved lenticular lens pattern could be completely filled with the UV-curable resin, followed by curing, thereby forming a pattern layer having a low refractive index layer directly formed on the high refractive index layer.

A bonding agent for polarizing plates (Z-200, Nippon Goshei Co., Ltd.) was coated onto one surface of the low refractive index layer, which in turn was bonded to the fabricated polarizer, followed by curing, thereby fabricating a polarizing plate.

Example 2: Manufacture of Polarizing Plate

A polarizer was manufactured in substantially the same manner as in Example 1.

A coating layer was formed by coating a UV-curable resin (SSC155, Shin-A T&C) onto one surface of a transparent PET film (COSMOSHINE SRF, thickness: 80 µm, Re=14,000 nm at a wavelength of 550 nm, Toyobo Co., Ltd.) for a first protective layer. Using a film having an embossed prism pattern (pitch: 13 µm, height: 10 µm, vertex angle: 65.5°, triangular cross-section) formed thereon, an engraved prism pattern was formed on the coating layer, followed by curing, thereby forming a high refractive index layer on the PET film. Then, a UV-curable resin (SSC140, Shin-A T&C) was coated onto the high refractive index layer such that the engraved prism pattern could be completely filled with the UV-curable resin, followed by curing, thereby forming a pattern layer having a low refractive index layer directly formed on the high refractive index layer.

A bonding agent for polarizing plates (Z-200, Nippon Goshei Co., Ltd.) was coated onto one surface of the low refractive index layer, which in turn was bonded to the fabricated polarizer, followed by curing, thereby fabricating a polarizing plate.

Example 3: Manufacture of Polarizing Plate

A polarizer was manufactured in substantially the same manner as in Example 1.

A coating layer was formed by coating a UV-curable resin (SSC155, Shin-A T&C) onto one surface of a transparent PET film (COSMOSHINE SRF, thickness: 80 µm, Re=14,000 nm at a wavelength of 550 nm, Toyobo Co., Ltd.) for a first protective layer. Using a film having an embossed lenticular lens pattern (pitch: 10 µm, height: 10 µm) and a flat portion (pitch: 10 µm) alternately formed thereon, an engraved lenticular lens pattern and a flat portion were formed on the coating layer, followed by curing, thereby forming a high refractive index layer on the PET film. Then, a UV-curable resin (SSC143, Shin-A T&C) was coated onto the high refractive index layer such that the engraved lenticular lens pattern could be completely filled with the UV-curable resin, followed by curing, thereby forming a pattern layer having a low refractive index layer directly formed on the high refractive index layer.

A bonding agent for polarizing plates (Z-200, Nippon Goshei Co., Ltd.) was coated onto one surface of each of the low refractive index layer and a TAC film for a second protective film (KC4DR-1, thickness: 40 μm, Konica Co., Ltd.), which in turn were bonded to the fabricated polarizer such that the low refractive index layer, the polarizer and the TAC film were sequentially stacked in that order, followed by curing, thereby fabricating a polarizing plate.

Example 4: Manufacture of Polarizing Plate

A polarizer was manufactured in substantially the same manner as in Example 1.

A coating layer was formed by coating a UV-curable resin (SSC155, Shin-A T&C) onto one surface of a transparent PET film (COSMOSHINE SRF, thickness: 80 μm, Re=14,000 nm at a wavelength of 550 nm, Toyobo Co., Ltd.) for a first protective layer. Using a film having an embossed prism pattern (pitch: 13 μm, height: 10 μm, vertex angle: 65.5°, triangular cross-section) formed thereon, an engraved prism pattern was formed on the coating layer, followed by curing, thereby forming a high refractive index layer on the PET film. Then, a UV-curable resin (SSC143, Shin-A T&C) was coated onto the high refractive index layer such that the engraved prism pattern could be completely filled with the UV-curable resin, followed by curing, thereby forming a pattern layer having a low refractive index layer directly formed on the high refractive index layer.

A bonding agent for polarizing plates (Z-200, Nippon Goshei Co., Ltd.) was coated onto one surface of each of the low refractive index layer and a TAC film for a second protective film (KC4DR-1, thickness: 40 μm, Konica Co., Ltd.), which in turn were bonded to the fabricated polarizer such that the low refractive index layer, the polarizer and the TAC film were sequentially stacked in that order, followed by curing, thereby fabricating a polarizing plate.

Example 5: Manufacture of Polarizing Plate

A polarizer was manufactured in substantially the same manner as in Example 1.

A coating layer was formed by coating a UV-curable resin (SSC155, Shin-A T&C) onto one surface of a transparent PET film (COSMOSHINE SRF, thickness: 80 μm, Re=14,000 nm at a wavelength of 550 nm, Toyobo Co., Ltd.) for a first protective layer. Using a film having an embossed lenticular lens pattern (pitch: 10 μm, height: 10 μm) and a flat portion (pitch: 10 μm) alternately formed thereon, an engraved lenticular lens pattern and a flat portion were formed on the coating layer, followed by curing, thereby forming a high refractive index layer on the PET film. Then, a UV-curable resin (SSC143, Shin-A T&C) was coated onto the high refractive index layer such that the engraved lenticular lens pattern could be completely filled with the UV-curable resin, followed by curing, thereby forming a pattern layer having a low refractive index layer directly formed on the high refractive index layer.

A bonding agent for polarizing plates (Z-200, Nippon Goshei Co., Ltd.) was coated onto one surface of each of the low refractive index layer and a COP film (ZB12, thickness: 50 μm, Zeon Co., Ltd.) for a second protective film, which in turn were bonded to the fabricated polarizer such that the low refractive index layer, the polarizer and the COP film were sequentially stacked in that order, followed by curing, thereby fabricating a polarizing plate.

Example 6: Manufacture of Polarizing Plate

A polarizer was manufactured in substantially the same manner as in Example 1.

A coating layer was formed by coating a UV-curable resin (SSC155, Shin-A T&C) onto one surface of a transparent TAC film (KC4DR-1, thickness: 40 μm, Konica Co., Ltd.) for a first protective layer. Using a film having an embossed lenticular lens pattern (pitch: 10 μm, height: 10 μm) and a flat portion (pitch: 10 μm) alternately formed thereon, an engraved lenticular lens pattern and a flat portion were formed on the coating layer, followed by curing, thereby forming a high refractive index layer on the TAC film. Then, a UV-curable resin (SSC143, Shin-A T&C) was coated onto the high refractive index layer such that the engraved lenticular lens pattern could be completely filled with the UV-curable resin, followed by curing, thereby forming a pattern layer having a low refractive index layer directly formed on the high refractive index layer.

A bonding agent for polarizing plates (Z-200, Nippon Goshei Co., Ltd.) was coated onto one surface of each of the low refractive index layer and a TAC film (KC4DR-1, thickness: 40 μm, Konica Co., Ltd.) for a second protective film, which in turn were bonded to the fabricated polarizer such that the low refractive index layer, the polarizer and the TAC film were sequentially stacked in that order, followed by curing, thereby fabricating a polarizing plate.

Example 7: Manufacture of Polarizing Plate

A polarizer was manufactured in substantially the same manner as in Example 1.

A coating layer was formed by coating a UV-curable resin (SSC155, Shin-A T&C) onto one surface of a transparent COP film (ZB12, thickness: 50 μm, Zeon Co., Ltd.) for a first protective layer. Using a film having an embossed lenticular lens pattern (pitch: 10 μm, height: 10 μm) and a flat portion (pitch: 10 μm) alternately formed thereon, an engraved lenticular lens pattern and a flat portion were formed on the coating layer, followed by curing, thereby forming a high refractive index layer on the COP film. Then, a UV-curable resin (SSC143, Shin-A T&C) was coated onto the high refractive index layer such that the engraved lenticular lens pattern could be completely filled with the UV-curable resin, followed by curing, thereby forming a pattern layer having a low refractive index layer directly formed on the high refractive index layer.

A bonding agent for polarizing plates (Z-200, Nippon Goshei Co., Ltd.) was coated onto one surface of each of the low refractive index layer and a TAC film (KC4DR-1, thickness: 40 μm, Konica Co., Ltd.) for a second protective film, which in turn were bonded to the fabricated polarizer such that the low refractive index layer, the polarizer and the TAC film were sequentially stacked in that order, followed by curing, thereby fabricating a polarizing plate.

Comparative Example 1: Manufacture of Polarizing Plate

A polarizer was manufactured in the same manner as in Example 1.

A bonding agent for polarizing plates (Z-200, Nippon Goshei Co., Ltd.) was coated onto both surfaces of the polarizer, which in turn was bonded to a transparent PET film (COSMOSHINE SRF, thickness: 80 μm, Re=14,000 nm at a wavelength of 550 nm, Toyobo Co., Ltd.) for a first protective layer and a TAC film (KC4DR-1, thickness: 40 μm, Konica Co., Ltd.) for a second protective film such that the transparent PET film, the polarizer, and the TAC film were sequentially stacked in that order, followed by curing, thereby fabricating a polarizing plate.

Components of the polarizing plates fabricated in Examples and Comparative Example are shown in Table 1. In addition, the polarizing plates were evaluated as to the following properties. For this purpose, each liquid crystal display module was manufactured using the following method.

Preparative Example 1: Manufacture of Polarizing Plate

A polarizer was manufactured by stretching a polyvinyl alcohol film at 60° C. to 3 times an initial length thereof and adsorbing iodine to the stretched film, followed by stretching the resulting film to 2.5 times the stretched length of the film in an aqueous solution of boric acid at 40° C. Triacetylcellulose films (thickness: 80 μm) were bonded to both surfaces of the polarizer via a bonding agent for polarizing plates (Z-200, Nippon Goshei Co., Ltd.), thereby providing a polarizing plate.

Preparative Example 2: Manufacture of Composite Optical Sheet

A composition comprising 35 wt % of epoxy acrylate, 15 wt % of a urethane acrylate oligomer, 36 wt % of orthophenyl phenol ethoxylated acrylate, 10 wt % of trimethylolpropane 9-ethoxylated acrylate, and 4 wt % of a photoinitiator was prepared.

The composition was coated onto one surface of a polyethylene terephthalate (PET) film (T910E, thickness: 125 μm, Mitsubishi Co., Ltd.) for a first base film to form a coating layer. A prism pattern (triangular cross-section, height: 12 μm, pitch: 24 μm, vertex angle: 90°, aspect ratio: 0.5) was transferred from a pattern roll having an embossed pattern corresponding to the prism pattern to the coating layer, followed by curing, thereby forming a first optical sheet having a first prism pattern formed thereon.

The composition was coated onto one surface of a polyethylene terephthalate (PET) film (T910E, thickness: 125 μm, Mitsubishi Co., Ltd.) for a second base film to form a coating layer. A prism pattern (triangular cross-section, height: 12 μm, pitch: 24 μm, vertex angle: 90°, aspect ratio: 0.5) was transferred from a pattern roll having an embossed pattern corresponding to the prism pattern to the coating layer, followed by curing, thereby forming a second optical sheet having a second prism pattern formed thereon.

A composite optical sheet was manufactured by stacking the second optical sheet on the first optical sheet such that the longitudinal direction of the first prism pattern was orthogonal to the longitudinal direction of the second prism pattern.

Preparative Example 3: Manufacture of Liquid Crystal Display Module

Each of the polarizing plates of Examples or Comparative Example, a liquid crystal panel (PVA mode), and the polarizing plate of Preparative Example 1 were sequentially stacked one on top of another via bonding layers, and the composite optical sheet fabricated in Preparative Example 2 was attached to a lower side of the first polarizing plate of Preparative Example 1, thereby fabricating a liquid crystal display module.

(1) Brightness: An LED light source, a light guide plate, and a liquid crystal display module were assembled to fabricate a liquid crystal display including an edge type LED light source at one side thereof (having the same configuration as a Samsung LED TV (UN32H5500)) except for the configuration of the liquid crystal display modules manufactured in Examples and Comparative Example. Front brightness was measured using an EZ CONTRAST X88RC (EZXL-176R-F422A4, ELDIM Co., Ltd.). Relative brightness was calculated by {(brightness of Examples and Comparative Example)/(brightness of Comparative Example 1)}×100.

(2) ½ viewing angle and ⅓ aviewing angle: A liquid crystal display was manufactured in the same manner as in Evaluation Item (1), and brightness was measured using an EZ CONTRAST X88RC (EZXL-176R-F422A4, ELDIM Co., Ltd.). ½ viewing angle and ⅓ viewing angle refer to viewing angles at which brightness values become ½ and ⅓ of front brightness, respectively.

(3) Contrast ratio: A liquid crystal display was manufactured in the same manner as in Evaluation Item 1, and a spherical coordinate system ($\phi$, $\theta$) and contrast ratio were measured using an EZ CONTRAST X88RC (EZXL-176R-F422A4, ELDIM Co., Ltd.).

(4) Brightness uniformity and Variation ratio of brightness uniformity: A 50" or 55" liquid crystal display as listed in Table 1 was manufactured by assembling an LED light source, a light guide plate, a liquid crystal display module, and a screen unit having a major axis and a minor axis. Referring to FIG. 9, in the liquid crystal display including the light source, the light guide plate and the liquid crystal display module, brightness was measured at each of points A, B and C, wherein a central point, a left end point and a right end point of a display screen are indicated by B, A and C, respectively, and a maximum brightness value (Brightness max) and a minimum brightness value (Brightness min) were obtained. Brightness uniformity can be calculated by (Brightness min)/(Brightness max)×100. In measurement of brightness, a brightness tester EZ CONTRAST X88RC (EZXL-176R-F422A4, ELDIM Co., Ltd.) was secured to the point B, and was then directed to face each of the points A, B and C. Then, brightness uniformity for 50" LCD (a) and brightness uniformity for 55" LCD (b) were obtained. A variation ratio of brightness uniformity could be calculated by |b−a|/a×100.

TABLE 1

| | | Example 1 | Example 2 | Example 3 | Example 4 | Example 5 | Example 6 | Example 7 | Comparative Example 1 |
|---|---|---|---|---|---|---|---|---|---|
| Protective layer | First protective layer | PET | PET | PET | PET | PET | TAC | COP | PET |

TABLE 1-continued

|  |  | Example 1 | Example 2 | Example 3 | Example 4 | Example 5 | Example 6 | Example 7 | Comparative Example 1 |
|---|---|---|---|---|---|---|---|---|---|
|  | Second protective layer | Absent | Absent | TAC | TAC | COP | TAC | TAC | TAC |
| High refractive index layer | Refractive index | 1.57 | 1.57 | 1.57 | 1.57 | 1.57 | 1.57 | 1.57 | — |
|  | Engraved pattern | Lenticular | Prism | Lenticular | Prism | Lenticular | Lenticular | Lenticular | — |
|  | Aspect ratio of engraved pattern | 1.0 | 0.77 | 1.0 | 0.77 | 1.0 | 1.0 | 1.0 | — |
|  | Presence of flat portion | Present | Absent | Present | Absent | Present | Present | Present | — |
| Low refractive index layer | Refractive index | 1.42 | 1.42 | 1.45 | 1.45 | 1.45 | 1.45 | 1.45 | — |
| Brightness | Central Brightness (nit) | 182 | 183 | 192 | 193 | 191 | 194 | 192 | 241 |
|  | Relative Brightness (%) | 75.5 | 75.9 | 79.7 | 80.1 | 79.3 | 80.5 | 79.7 | 100 |
| ½ Viewing angle (°) | Left-right | 65.5 | 70.3 | 62.9 | 67.5 | 63.1 | 62.9 | 63.2 | 50.4 |
|  | Up-down | 46.1 | 43.8 | 46.0 | 43.5 | 46.0 | 46.1 | 45.8 | 46.0 |
| ⅓ Viewing angle (°) | Left-right | 82.2 | 82.5 | 77.5 | 77.8 | 77.9 | 77.7 | 77.6 | 60.6 |
|  | Up-down | 57.0 | 54.9 | 57.2 | 57.6 | 57.2 | 57.1 | 57.5 | 56.6 |
| Contrast ratio | (0°, 0°) | 12776 | 10389 | 12583 | 10285 | 12489 | 12469 | 12366 | 20207 |
|  | (180°, 0°) | 1383 | 1546 | 1416 | 1540 | 1435 | 1425 | 1422 | 959 |
|  | (0°, 60°) | 1436 | 1579 | 1434 | 1582 | 1425 | 1445 | 1427 | 973 |
| Brightness uniformity (%) | 50" | 80.5 | 71.7 | 80.3 | 71.5 | 80.1 | 80.3 | 80.0 | 66.1 |
|  | 55" | 77.1 | 70.7 | 77.8 | 71.2 | 77.5 | 77.7 | 76.8 | 61.1 |
| Variation ratio of brightness uniformity (%) |  | 4.22 | 1.39 | 3.11 | 0.42 | 3.25 | 3.24 | 4 | 7.56 |

As shown in Table 1, the liquid crystal display modules manufactured with polarizing plates in Examples had high front brightness, could increase side viewing angle by increasing ½ viewing angle and ⅓ viewing angle, and had high side contrast ratio. In addition, the liquid crystal display modules manufactured with polarizing plates in Examples could increase brightness uniformity, and were not required to be changed due to size change of a liquid crystal display by reducing or minimizing variation in brightness uniformity depending upon screen size of the liquid crystal display, thereby improving processability and economic feasibility. Accordingly, embodiments of the preset invention provide polarizing plates capable of improving side contrast ratio, side viewing angle, and brightness uniformity while minimizing variation of brightness uniformity.

On the contrary, the liquid crystal display module of Comparative Example 1, which did not employ the polarizing plates of Examples, exhibited insignificant improvement in viewing angle and contrast ratio despite having relatively high brightness. Further, the liquid crystal display module of Comparative Example 1, which did not employ the polarizing plates of Examples, exhibited low brightness uniformity and significant variation in brightness uniformity depending upon screen size of the liquid crystal display, and thus had low processability and economic feasibility, as compared with the liquid crystal display modules manufactured with polarizing plates in Examples.

It should be understood that various modifications, changes, alterations, and equivalent embodiments can be made by those skilled in the art without departing from the spirit and scope of the present invention, example embodiments of which are defined by appended claims and their equivalents.

What is claimed is:

1. A polarizing plate comprising:
   a polarizer;
   a pattern layer on a light exiting plane and upper plane of the polarizer, the pattern layer comprising a first refractive index resin layer having at least one engraved pattern and a second refractive index resin layer having a filling pattern completely filling the engraved pattern, the first refractive index resin layer having a higher refractive index than the second refractive index resin layer, the first refractive index resin layer being formed on a light exiting plane of the second refractive index resin layer, a top part of the engraved pattern being formed to a direction opposed to the light exiting plane of the polarizer, the first refractive index resin layer having a refractive index of about 1.50 to about 1.65, and a difference in refractive index between the first refractive index resin layer and the second refractive index resin layer being about 0.10 to about 0.15; and
   a first protective layer,
   the polarizing plate having a stack structure in which the polarizer, the second refractive index resin layer, the first refractive index resin layer and the first protective layer are sequentially stacked in that order, or a stack structure in which the polarizer, the first protective layer, the second refractive index resin layer and the first refractive index resin layer are sequentially stacked in that order,
wherein the first protective layer comprises a base film comprising at least one resin of triacetylcellulose, polyethylene terephthalate, cyclic olefin polymer, and acrylic resins.

2. The polarizing plate according to claim 1, wherein the engraved pattern comprises an optical pattern having a curved surface, or a prism pattern having a triangular to decagonal cross-section.

3. The polarizing plate according to claim 1, wherein the engraved pattern comprises an optical pattern having a truncated triangular cross-sectional prism shape, a truncated lenticular lens shape, or a shape having one or more flat surfaces at an uppermost surface thereof and having an n-gonal cross-section, n being an integer greater than or equal to 5.

4. The polarizing plate according to claim 1, wherein the first refractive index resin layer further comprises a flat portion between adjacent engraved patterns.

5. The polarizing plate according to claim 4, wherein a ratio of a maximum pitch of the engraved pattern to a pitch of the flat portion is about 1 or less.

6. The polarizing plate according to claim 1, wherein the first protective layer has an in-plane retardation (Re) of about 8,000 nm or more at a wavelength of 550 nm and comprises a polyethylene terephthalate resin.

7. The polarizing plate according to claim 1, wherein the first protective layer comprises the base film and a primer layer on at least one surface of the base film, and a ratio of a refractive index of the primer layer to a refractive index of the base film is about 1.0 or less.

8. The polarizing plate according to claim 7, wherein the first protective layer has a light transmittance of about 90% or more at a wavelength of 550 nm.

9. The polarizing plate according to claim 1, wherein the first protective layer is formed by uniaxially stretching a base film comprising the polyethylene terephthalate resin.

10. The polarizing plate according to claim 1, wherein the second refractive index resin layer, the first refractive index resin layer, and the first protective layer are sequentially stacked on the polarizer.

11. The polarizing plate according to claim 10, wherein the first refractive index resin layer is directly on the first protective layer.

12. The polarizing plate according to claim 10, further comprising a bonding layer between the polarizer and the second refractive index resin layer.

13. The polarizing plate according to claim 1, further comprising a second protective layer on another surface of the polarizer that is opposite the one surface.

14. The polarizing plate according to claim 13, wherein the second protective layer comprises a film comprising at least one of triacetylcellulose, polyethylene terephthalate, cyclic olefin polymer, and acrylic resins.

15. A liquid crystal display comprising the polarizing plate according to claim 1.

* * * * *